May 23, 1944.　　J. W. BERTETTI　　2,349,403
AUTOMATIC SAMPLER
Filed Sept. 12, 1940　　2 Sheets-Sheet 1

J. W. BERTETTI
INVENTOR.

Lester B. Clark
ATTORNEY.

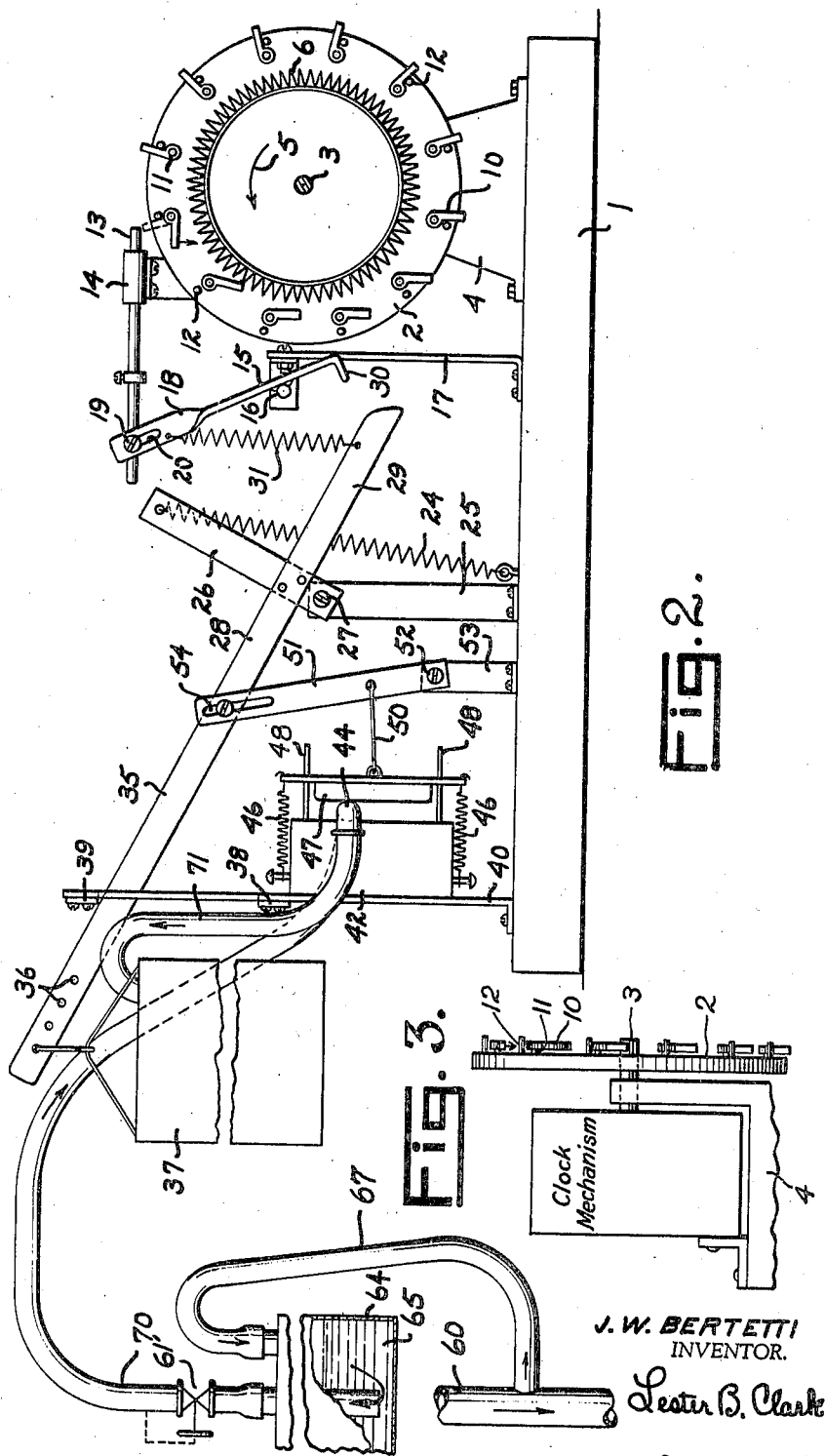

Patented May 23, 1944

2,349,403

UNITED STATES PATENT OFFICE 2,349,403

AUTOMATIC SAMPLER

John W. Bertetti, Galveston, Tex.

Application September 12, 1940, Serial No. 356,412

9 Claims. (Cl. 73—21)

This invention relates to an automatic sampler and particularly to a device for obtaining a composite fluid sample comprising a plurality of small samples of the fluid taken at intervals over a period from a source of fluid whereby the average composition of the fluid delivered from such source may be ascertained.

The primary object of the invention is to provide a new and improved sampler which operates positively and automatically to obtain a composite sample from a source of fluid.

Another object is to obtain a composite sample by periodically introducing a quantity of sample fluid into a chamber containing a liquid which is neutral with respect to the sample, the liquid within the chamber being displaced by the sample fluid.

Another object is to provide a device of the class described in which the displaced liquid is caused to terminate the flow of sample fluid to the sample chamber.

Still another object is to provide a device of the class described in which the taking of a small quantity of sample fluid to be added to the previously collected quantity of such fluid is initiated by a timing mechanism and is terminated by the addition of a predetermined quantity of fluid to that previously collected.

Another object is to provide an automatic sampler which is capable of obtaining composite liquid samples of a fluid which is normally gaseous but which may be maintained in liquid form by maintaining proper conditions in the sampling apparatus.

A more specific object of the invention is to provide a sample receiving chamber which is initially filled with a liquid of which portions are intermittently displaced by sample fluid, the displaced portions of liquid being conducted to a leaky container which together with the displaced liquid acts as a mass to operate the mechanism for terminating the flow of the sampled fluid into the sample receiving chamber.

The invention together with its objects and advantages will be best understood by a consideration of the following description of the illustrative preferred embodiment which is shown in the accompanying drawings and in which:

Fig. 2 is a diagrammatic illustration of an embodiment similar to that shown in Fig. 1 and showing the relative position of parts when a quantity of sample fluid is being admitted to the sample receiving chamber.

Fig. 3 is a broken detail of a clock mechanism for driving the timing means.

Figure 1:
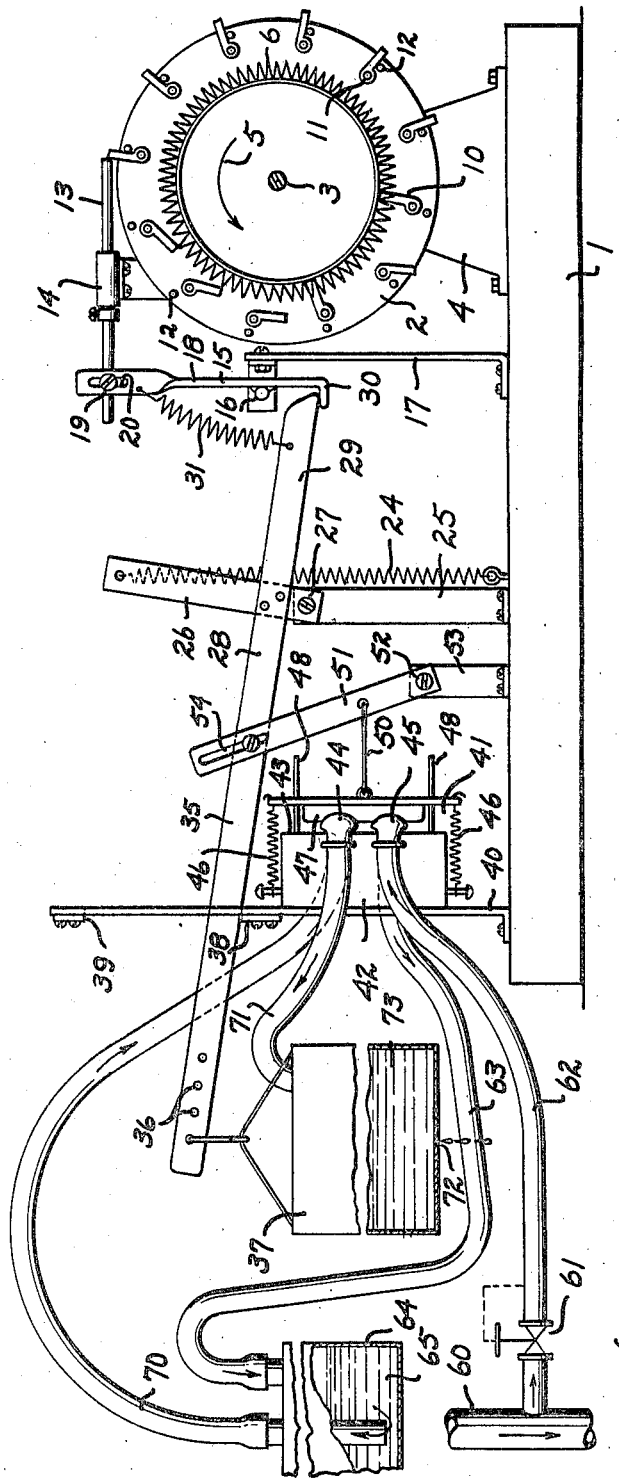
Fig. 1 is a diagrammatic illustration of the embodiment of the invention showing the relative position of elements at a time when no fluid is being admitted to the sample receiving chamber.

References to "fluid" in this specification contemplates the inclusion of any freely moving material which may be liquid or gaseous and which may include finely divided material made freely movable by admixture with a liquid or gaseous medium.

Referring to the drawings it will be seen that the illustrated embodiment comprises a base 1 upon which a disk 2 is rotatably mounted on shaft 3 journaled upon a standard 4 attached to the base. A time controlled mechanism (not shown) drives the shaft 3 and the disk 2 in a counterclockwise direction as indicated by the arrow 5. If the flow in the pipe line 60, from which a composite sample is to be taken, is substantially constant the shaft 3 may be driven by any suitable timing mechanism such as an electrical or mechanical clock, etc. If however the flow in the pipe line 60 is variable the shaft 3 may be driven in accordance with the rate of flow in such pipe line as by a fluid motor operated by the fluid in the pipe line or the rate of driving of the shaft may be effected or controlled by a drop in pressure along the line as by the use of an orifice in the line.

Adjacent the periphery of the disk 2 are a plurality of dogs 10 pivotally mounted upon pins 11, the dogs being of such configuration that they engage the associated stops or pins 12 as they move upwardly during the rotation of the disk. Accordingly the individual dogs extend radially outwardly as they move upwardly and are in such position as they approach the uppermost limit of travel that they successively engage a push rod 13 which is slidably received in a bearing member 14 mounted upon and extending upwardly from the standard 4.

A latch arm 15 is pivotally mounted at 16 upon an upright 17 mounted on the base 1. The upper end 18 of this latch arm is connected to the push rod 13 by a screw 19 passing through the slot 20 in the end 18 such screw being secured in the push rod 13.

A support 25 mounted on the base 1 has an upwardly extending bar 26 pivotally attached thereto at 27 and such bar is constantly urged to rotate in a clockwise direction upon its pivot by a tension spring 24 attached to the bar 26 and the base 1. A lever 28 is fixed upon the bar 26 adjacent its lower end and such lever has its end 29 adapted to engage the flanged end 30 of the latch arm 15. A spring 31 has its ends attached to the lever 28 and the upper end 18 of the latch arm 15. This spring is of such material and dimensions that when the parts are in the relative position shown in Fig. 1 it acts as a compression spring and hence tends to hold the lever arm 28 and the latch arm 15 in latching position. The spring 31 hence cooperates with the spring 24 to initiate movement of the arm 26 as will more fully appear but such spring 31 becomes a tension spring as the lever 28 moves to the position shown in Fig. 2.

The other end 35 of the lever 28 is provided with a plurality of openings 36 so that a container 37 may be adjustably supported at different distances from the pivot of the lever. This feature enables the adjustment of the volume of the individual samples which enter into the composite sample taken over a period of time.

The upper and lower limits of travel of the lever 28 are determined by stops 38 and 39 such stops being secured to the standard 40 mounted on the base 1. This standard also supports a valve mechanism generally referred to as 41. This mechanism is shown as comprising a block 42 having a face 43 across which pass flexible tubes or conduits 44 and 45.

These conduits are normally held collapsed upon the face 43 by the force exerted by the springs 46 which constantly urge the bar 47 to the left upon the guide rods 48. It seems apparent that this structure acts as a valve, such valve being operated by a pull exerted upon a rod 50 attached to the bar 47 and the arm 51 pivoted at 52 upon a support 53 and having its upper end attached to the lever 28 by a pin and slot connection 54.

As already indicated the pipe 60 represents a line through which fluid is conducted and from which it is desired to obtain a composite sample in accordance with the invention. Fluid may be conducted from this pipe line through a valve 61 which is preferably a reducing valve which serves to supply fluid at its downstream side at a reduced and constant pressure, thence through the conduit 62 to the flexible conduit section 45 and thence by way of conduit 63 to the container 64 in which a composite sample is to be collected. It seems apparent that it is not necessary that both of the conduits 44 and 45 be closed in order to obtain satisfactory operation of the device. In Fig. 2 which is more fully described hereinafter a single closure of the conduit system is illustrated and such arrangement may be preferred for certain operating conditions.

The container 64 is initially filled with a liquid 65 which does not react either physically or chemically with the fluid withdrawn from the pipe line 60. This liquid is gradually displaced from within the container 64 through the conduit 70 to a suitable drain or to the flexible portion 44 of the conduit and thence by way of the tube 71 to the interior of the container 37 which, as previously indicated, is provided with an opening 72 in the bottom thereof so that the displaced liquid may leak therefrom during the interval between operations. If the displaced liquid is conducted directly to a suitable drain it is understood that a suitable source of liquid under constant pressure will supply liquid through the flexible portion 44 and tube 71 to the interior of the container 37.

The operation of the device seems apparent from the foregoing description but, by way of summary, attention is directed to the essential features in the operation of the device. It will be assumed that the disk 2 is being rotated in the direction indicated by the arrow 5 and that the respective elements of the device are in the position shown in Fig. 1, the leaky container and liquid previously discharged therein having previously moved the lever 28 to a position of latched engagement with the flanged end 30 of the latch arm 15.

During the rotation of the disk 2, the liquid 73 discharges from the container 37 through the opening 72. This opening is of such size that all or substantially all of the liquid 73 is drained from the container as one of the dogs 10 approaches the outer end of the push rod 13. As the weight of the container 37 and the liquid 73 decreases the arm 28 tends to rotate upon its pivot under the influence of the spring 24. Such rotation is prevented by the latch engagement between the end 29 of the lever and the flanged end 30 of the latch arm 15. Hence the valve mechanism 41 is maintained in closed position and no fluid is admitted through the conduits 62 and 63 to the container 64.

When one of the dogs 10 engages the push rod 13 the lever 28 is released and rotates in a clockwise direction under the influence of spring 24. As the push rod 13 moves to the left during this operation, the actuating dog 10 rocks upon its pivot 11 under the influence of gravity and hence is removed from the line of movement of the push rod until it is again brought to a radial position by the rotation of the disc 2. By virtue of the rotation of the lever 28 as just described fluid is admitted from the pipe line 60 to the interior of the container 64 and displaces a quantity of the liquid 65 which passes through the tubes 70 and 71 to the interior of the container 37.

When a sufficient quantity of the liquid 65 has been displaced such that the weight of the body of liquid 73 and the container 37 is sufficient to overcome the tension exerted by the spring 24, the container 37 will cause the end 35 of the lever 28 to move downwardly whereupon the spring 31 rocks the latch arm 15 and the end 29 of the lever again becomes latched so that the cycle of operation just described will be repeated.

As already described, the disk 2 may be driven at any desired rate of speed to initiate the taking of samples at intervals. The flexibility of the device of the invention is enhanced by the arrangement whereby dogs 10 mounted on the disc 2 may be selectively retained in inoperative position by moving such dogs into engagement with the spring 6 mounted upon the disc. In this manner a quantity of sample fluid may be obtained at any desired interval. Accordingly the composite sample collected within the container 64 is obtained and it is possible to determine the average composition, over a period of time, of the fluid conducted through the pipe line 60.

In Fig. 2 there is shown the general construction of Fig. 1 and like parts are identified by the same reference characters and are shown in the relative positions assumed when a quantity of fluid is being admitted from the pipe line 60 to the interior of the sample receiving chamber 64. In this embodiment, however, the conduit 67 is directly connected between the pipe line 60 and the chamber 64 and a pressure control valve 61' is provided at the outlet from the chamber.

This construction is of particular utility where it is desired to obtain a composite sample of a pipe line liquid which is normally gaseous but which remains liquid when a pressure in excess of a given amount is maintained thereon. It is to be understood of course that this feature may be utilized when obtaining a composite sample of other fluids than those of the type indicated. It is also to be understood that such valves may be used in the conduit system of the device that the composite sample may be obtained at pipe line pressure.

Broadly the invention comprehends a novel construction which is automatically operable to obtain a composite fluid sample from a source of fluid whereby the average composition of the fluid from such source may be determined.

What is claimed is:

1. A device for obtaining a composite sample of fluid from a source of fluid, said device including a displacement chamber, a quantity of liquid therein, said liquid being neutral with respect to the fluid to be sampled, a conduit between said source and chamber, means for supplying fluid from the source to the conduit at a constant pressure, a mass including a leaky container, means for conducting displaced liquid to said container, means comprising said container for closing the passage through said conduit when the container and liquid from said displacement chamber exceed a predetermined weight, and time controlled means including said first mentioned means for opening the passage at predetermined intervals.

2. A device for obtaining a composite sample of fluid from a source of fluid, said device including a displacement chamber, a quantity of liquid therein, said liquid being neutral with respect to the fluid to be sampled, a conduit between said source and chamber, means for supplying fluid from the source to the conduit at a constant pressure, a lever, a leaky container on said lever, means for conducting liquid from the displacement chamber to said container, and valve means operable by movement of said lever and container to close the conduit when a predetermined quantity of liquid is forced into the container.

3. A device for obtaining a sample of fluid from a source of fluid, said device including a displacement chamber, a quantity of liquid therein, said liquid being neutral with respect to the fluid to be sampled, a conduit between said source and chamber, means for supplying fluid from the source to the conduit at a constant pressure, a lever, a leaky container on said lever, a conduit for conducting liquid from the displacement chamber to the container, valve means operable by movement of said lever and container to close at least one of said conduits when a predetermined quantity of liquid is forced into the container.

4. A device for obtaining a sample of fluid from a source of fluid comprising a displacement chamber, a quantity of liquid therein, said liquid being neutral with respect to the fluid to be sampled, a normally closed conduit providing a passage between said source and chamber, means for opening intermittently the passage through the conduit to admit fluid from the source to said chamber, and means operable by a predetermined quantity of liquid displaced from the chamber for actuating said first mentioned means to terminate the flow of fluid through the conduit.

5. A device for obtaining a sample of fluid from a source of fluid comprising a displacement chamber, a quantity of liquid therein, said liquid being neutral with respect to the fluid to be sampled, a normally closed conduit providing a passage between said source and chamber, means for opening intermittently the passage through the conduit to admit fluid to the chamber, and means operable by a predetermined quantity of liquid displaced from the chamber for terminating the flow of fluid through the conduit.

6. In a sample taking device for fluids, a sample chamber, a neutral liquid in said chamber, means for admitting intermittently a sample to said chamber and displacing a quantity of the liquid therefrom, and means operable by the liquid displaced from said chamber by the incoming fluid for controlling the admission of the sample, said last mentioned means comprising a valve operable by the displaced liquid.

7. In a vapor or gaseous sample taking device, a sample chamber, a neutral liquid in said chamber, means for admitting intermittently a gaseous sample to said chamber, and means operable by the weight of the liquid displaced from the chamber by the incoming sample for terminating the admission of the sample by closing said means.

8. A device for obtaining a sample of fluid from a source of fluid comprising a displacement chamber, a quantity of neutral liquid therein, a conduit between said source and chamber, a normally closed conduit passage through which the liquid may be displaced from said chamber, means for opening said conduit passage, and means operable by a predetermined quantity of liquid displaced from the chamber for closing said conduit passage.

9. In a sample taking device for fluids, a conduit between a source of fluid and a sample chamber, a lever, a mass including a container mounted on said lever, a conduit for supplying liquid from a source of liquid to said container, valves to normally close said conduits, means for intermittently opening said valves, means whereby a predetermined quantity of liquid entering said container causes said lever to close said valves in said conduits, and means for removing liquid from said container.

JOHN W. BERTETTI.